(12) United States Patent
Rapeanu

(10) Patent No.: US 7,362,599 B2
(45) Date of Patent: Apr. 22, 2008

(54) SWITCHING POWER SUPPLY WITH CAPACITOR INPUT FOR A WIDE RANGE OF AC INPUT VOLTAGES

(75) Inventor: Radu-Cornel Rapeanu, Mont-Royal (CA)

(73) Assignee: Thomas & Betts International, Inc., Wilmaington, DE (US)

( * ) Notice: Subject to any disclaimer, the term of this patent is extended or adjusted under 35 U.S.C. 154(b) by 54 days.

(21) Appl. No.: 11/214,198

(22) Filed: Aug. 29, 2005

(65) Prior Publication Data

US 2006/0126368 A1    Jun. 15, 2006

Related U.S. Application Data

(60) Provisional application No. 60/635,472, filed on Dec. 13, 2004.

(51) Int. Cl.
    *H02M 7/217* (2006.01)

(52) U.S. Cl. ...................................................... 363/89

(58) Field of Classification Search ................... 363/89
    See application file for complete search history.

(56) References Cited

U.S. PATENT DOCUMENTS

| | | | |
|---|---|---|---|
| 4,128,867 A | 12/1978 | Heyman | |
| 4,270,166 A * | 5/1981 | Immler | ........................ 363/89 |
| 4,321,662 A | 3/1982 | Yokoyama | |
| 4,389,702 A | 6/1983 | Clemente et al. | |
| 4,433,368 A | 2/1984 | Choi | |
| 4,608,498 A | 8/1986 | Falzarano et al. | |
| 4,665,323 A | 5/1987 | Russell et al. | |
| 4,698,740 A * | 10/1987 | Rodgers et al. | ................ 363/89 |
| 4,864,488 A | 9/1989 | Bulmahn et al. | |
| 4,992,723 A * | 2/1991 | Zylstra et al. | ............... 323/324 |
| 5,572,415 A | 11/1996 | Mohan | |
| 5,646,502 A * | 7/1997 | Johnson | ........................ 307/66 |
| 5,771,164 A * | 6/1998 | Murai et al. | ................... 363/89 |
| 5,959,857 A | 9/1999 | Nagahara | |
| 6,055,166 A * | 4/2000 | Jacobs et al. | .................. 363/49 |
| 6,069,470 A * | 5/2000 | Feldtkeller | ................... 323/222 |
| 6,147,888 A | 11/2000 | Rivet | |
| 6,169,391 B1 * | 1/2001 | Lei | ............................ 323/266 |
| 6,236,584 B1 | 5/2001 | Koo | |
| 6,351,073 B1 | 2/2002 | Rapeanu | |
| 6,563,721 B1 | 5/2003 | Rapeanu | |
| 2004/0201278 A1 | 10/2004 | Hsu et al. | ...................... 307/11 |

* cited by examiner

*Primary Examiner*—Jeffrey Sterrett
(74) *Attorney, Agent, or Firm*—Hoffman & Baron, LLP

(57) ABSTRACT

A switching power supply includes a bridge rectifier, a switching device, and a controller. The bridge rectifier is operatively coupled to an alternating current (ac) signal, and outputs a rectified signal. The switching device is electrically connected in parallel with the bridge rectifier. The controller is responsive to the rectified signal and selectively controls the switching device to divert at least a portion of the rectified signal therethrough in response to the rectified signal. A method of supplying power includes coupling a bridge rectifier operatively to an alternating current (ac) signal, the bridge rectifier outputting a rectified signal, coupling a switching device electrically in parallel with the bridge rectifier, and controlling the switching device to divert at least a portion of the rectified signal therethrough in response to the rectified signal.

22 Claims, 8 Drawing Sheets

SWITCHING POWER SUPPLY WITH CAPACITOR INPUT FOR A WIDE RANGE OF AC INPUT VOLTAGES

CROSS REFERENCE TO RELATED APPLICATION

This application claims the benefit of U.S. Provisional Application No. 60/635,472, filed on Dec. 13, 2004, the disclosure of which is incorporated herein by reference.

BACKGROUND OF THE INVENTION

1. Field of the Invention

The present invention generally relates to switching power supplies. In particular, the present invention is directed to a switching power supply that converts an alternating current (ac) input signal having a wide range of voltages to a direct current (dc) output signal having a substantially constant voltage and/or current.

2. Description of the Prior Art

Switching power supplies have certain properties that make them desirable. For instance, there is very little power dissipation, making switching supplies efficient even if there is a large voltage drop required from input to output. Switching power supplies can also generate output voltages that exceed the input voltage, which enables these supplies to run directly from a rectified power line without requiring an alternating current (ac) power transformer. The result is a compact, lightweight, and efficient power supply that is desirable for universal use in a variety of applications.

Direct current (dc) power supplies must often adapt to wide variations in input voltages. A multiple source power supply may be required in certain applications where the output of the supply depends on the device being supplied. A multiple source power supply may derive its input from multiple ac lines, one or more batteries, or even solar collectors to power the load connected to the output terminals.

Two conventional solutions for implementing multiple input power supplies are provided in FIGS. 1 and 2. As shown in FIG. 1, one such solution uses a transformer 10 to establish electrical connection of a multi-input transformer ac supply to a dc regulator. The primary of the transformer 10 includes several taps 12 to accommodate different values of AC input voltage ($V_{AC1}$, $V_{AC2}$, $V_{AC3}$) and maintain approximately the same value at the secondary voltage $V_{IN}$. The secondary winding 16 may supply this voltage $V_{IN}$ to a power supply for rectification and generation of the dc power signal. A second solution that provides a similar result is shown in FIG. 2, in which power sources 12 are capacitively coupled to generate an ac voltage that is subsequently input to the power supply or load.

In each of the above configurations, it is necessary that the user manually select the connections for the ac input voltage during installation. Even in applications where power supplies have only two ac input connections, manual selection of the input connections is still required through incorporation of a multi-position switch or "intelligent" power supply having automated voltage selection capability. Since these solutions incorporate a multi-input circuit to accommodate various ac voltages, an undesirable selection must be made between manual setup for a particular voltage or the use of sophisticated and costly automatic voltage selection components.

Additional cost is incurred due to the expense of the purchase, installation, and maintenance of such voltage selection techniques. Inherent risks associated with the selection of an improper voltage can also result in improper functioning of the circuit and possible damage to the system within which it is implemented, thereby incurring additional financial cost and safety hazards.

It is therefore desirable to retain the range of ac input voltages that may be applied to a power supply circuit while minimizing the number of required inputs. Such a power supply circuit advantageously avoids restrictions on ac input voltage values.

As indicated above, some conventional solutions use a step-down transformer to convert the ac input signal to a lower voltage required by load circuitry. When the supply must be able to adapt to more than one ac input voltage, most conventional implementations use transformers with multi-tap inputs and fixed step-down ratios. As disclosed in U.S. Pat. No. 6,563,721, which is incorporated herein by reference, an alternative solution uses a single-tap (two-wire) input transformer in conjunction with a wide voltage-range switching regulator. In this instance, the power supply is essentially a voltage-to-voltage converter. That is, the supply converts a variable ac input voltage from a transformer secondary or battery into a constant dc output voltage required by the load.

As shown in FIG. 3, another solution incorporates a capacitor 18 electrically connected in series with a rectifier bridge 20 and a load 22. The impedance of the capacitor 18 limits the load current $I_{LOAD}$ to a predetermined value, and thus functions as a constant ac current generator. Since the ac input voltage $V_{IN}$ is typically much greater that the dc output load voltage $V_{LOAD}$, the ac current is fixed and essentially determined by the ac input voltage $V_{IN}$ and the value of capacitor 18. However, it is difficult to achieve high efficiency in such a power supply when using a constant-current ac generator to drive the voltage-to-voltage regulator.

As discussed above, to adapt the capacitor-input power supply to different ac input voltages, such as 120V, 277V, 437V, and the like, the multi-input design shown in FIG. 2 may be used, which requires separate capacitors 24, 26, and 28 and input connections for each ac voltage. However, this implementation increases the material cost, overall dimensions, and the risk of faulty installation.

It is therefore desirable to provide a power supply based on a single capacitor input that converts a wide range of input ac signals to a regulated dc output signal having substantially constant voltage and/or current.

SUMMARY OF THE INVENTION

A switching power supply formed in accordance with one form of the present invention, which incorporates some of the preferred features, includes a bridge rectifier, a switching device, and a controller. The bridge rectifier is operatively coupled to an alternating current (ac) signal, and outputs a rectified signal. The switching device is electrically connected in parallel with the bridge rectifier. The controller is responsive to the rectified signal and selectively controls the switching device to divert at least a portion of the rectified signal therethrough in response to the rectified signal.

The controller selectively controls the switching device with a control signal, having a substantially constant frequency with a modulated pulse width and/or a modulated frequency with a substantially constant pulse width. The controller selectively controls the switching device in response to a voltage or current at the output.

The power supply may include a first capacitor electrically coupled in parallel with the output of the power supply, a second capacitor electrically coupled in series with the alternating current (ac) signal, a fuse electrically coupled in series with the alternating current (ac) signal, a resistor responsive to the alternating current (ac) signal and electrically coupled in series with the bridge rectifier, and a diode electrically coupled in series with the bridge rectifier.

The switching device may include a bipolar transistor, field effect transistor (FET), metal oxide semiconductor field effect transistor (MOSFET), discrete device, relay, and/or integrated circuit. The controller may selectively control the switching device in response to a voltage and/or current at an output of the power supply. The controller may include a microprocessor, microcontroller, application specific integrated circuit (ASIC), programmable logic array (PLA), hybrid circuit, and/or discrete logic device.

The controller may be electrically coupled in parallel with the output and adapted to selectively control the switching device such that a substantially constant voltage is maintained at the output. The power supply may include a sensing resistor electrically coupled in series with the output and outputting a sensing signal. The controller may be responsive to the sensing signal and adapted to selectively control the switching device such that that a substantially constant current is maintained at the output in response to the sensing signal.

A method of supplying power in accordance with one form of the present invention, which incorporates some of the preferred features, includes coupling a bridge rectifier operatively to an alternating current (ac) signal, the bridge rectifier outputting a rectified signal, coupling a switching device electrically in parallel with the bridge rectifier, and controlling the switching device to divert at least a portion of the rectified signal therethrough in response to the rectified signal.

The method may include controlling the switching device with a control signal including a substantially constant frequency and a modulated pulse width, and/or a modulated frequency and a substantially constant pulse width. The method may control the switching device in response to a voltage and/or current at an output of the power supply.

These and other objects, features, and advantages of this invention will become apparent from the following detailed description of illustrative embodiments thereof, which is to be read in connection with the accompanying drawings.

DETAILED DESCRIPTION OF THE PREFERRED EMBODIMENTS

The present invention is directed to a low-power direct current (dc) power supply that provides a dc output signal having a substantially fixed voltage and/or current given a wide range of alternating current (ac) input voltages, such as 100Vac to 400Vac, applied to only a single input. The power supply preferably includes a capacitor electrically coupled in series with a low-voltage ac/dc switching power supply circuit.

The switching power supply formed in accordance with the present invention regulates a constant-voltage dc output by periodically shorting the output of a rectifier bridge. This enables the regulator to transfer only the amount of energy required by a load at the constant-voltage output while interfacing with a constant-current ac generator, that is, the series capacitor.

When compared with conventional transformer-input power supplies, the capacitor-input power supply formed in accordance with the present invention provides energy efficiency with very low power losses or heat dissipation, a leading power factor, and may be implemented without the use of inductive components. In addition the subject power supply is smaller and more cost efficient than transformer-based designs, which make it ideal for low-power applications.

Figure 1:
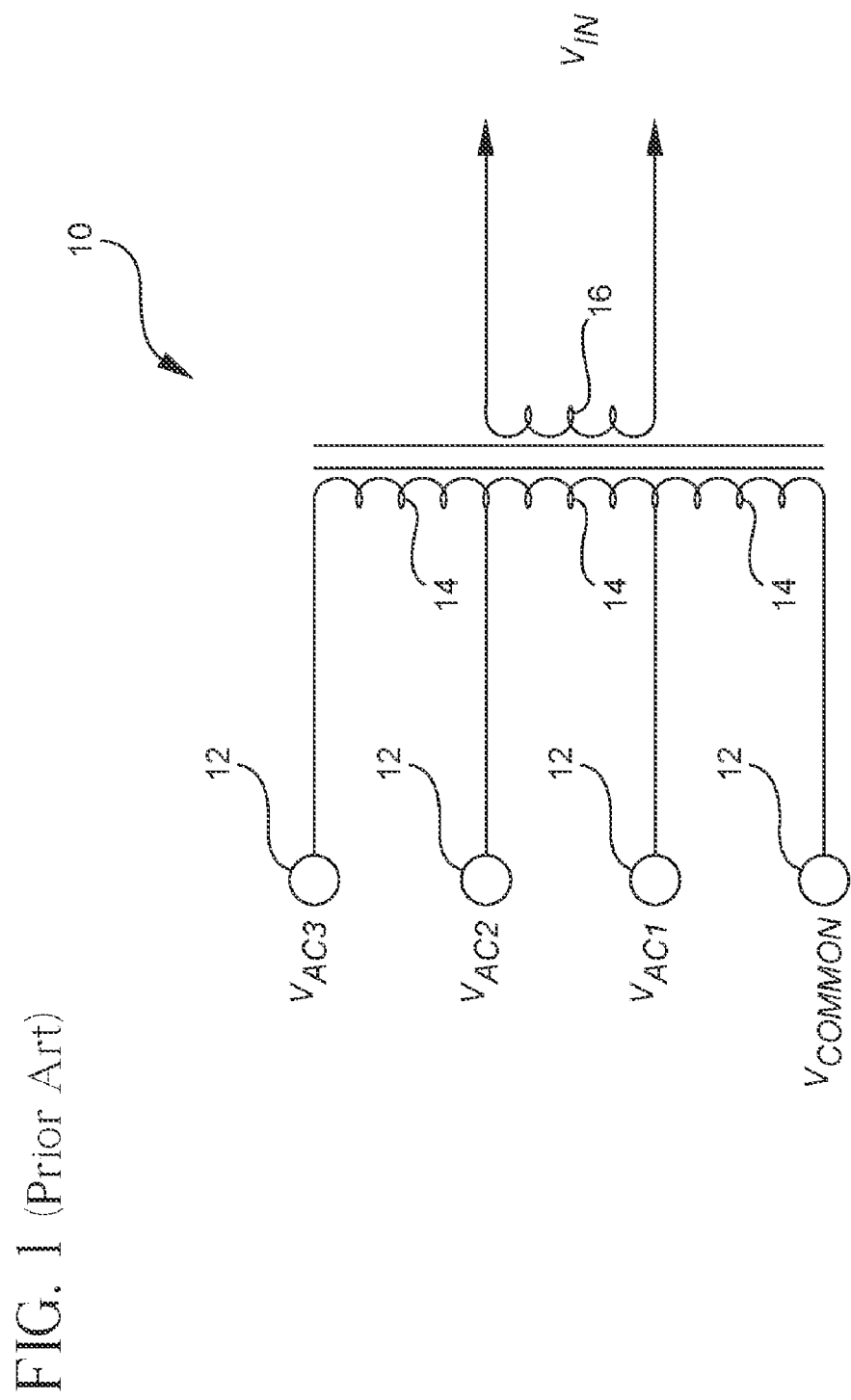
FIG. 1 is a schematic diagram of a conventional transformer-based multiple input circuit for a power supply.
Figure 2:
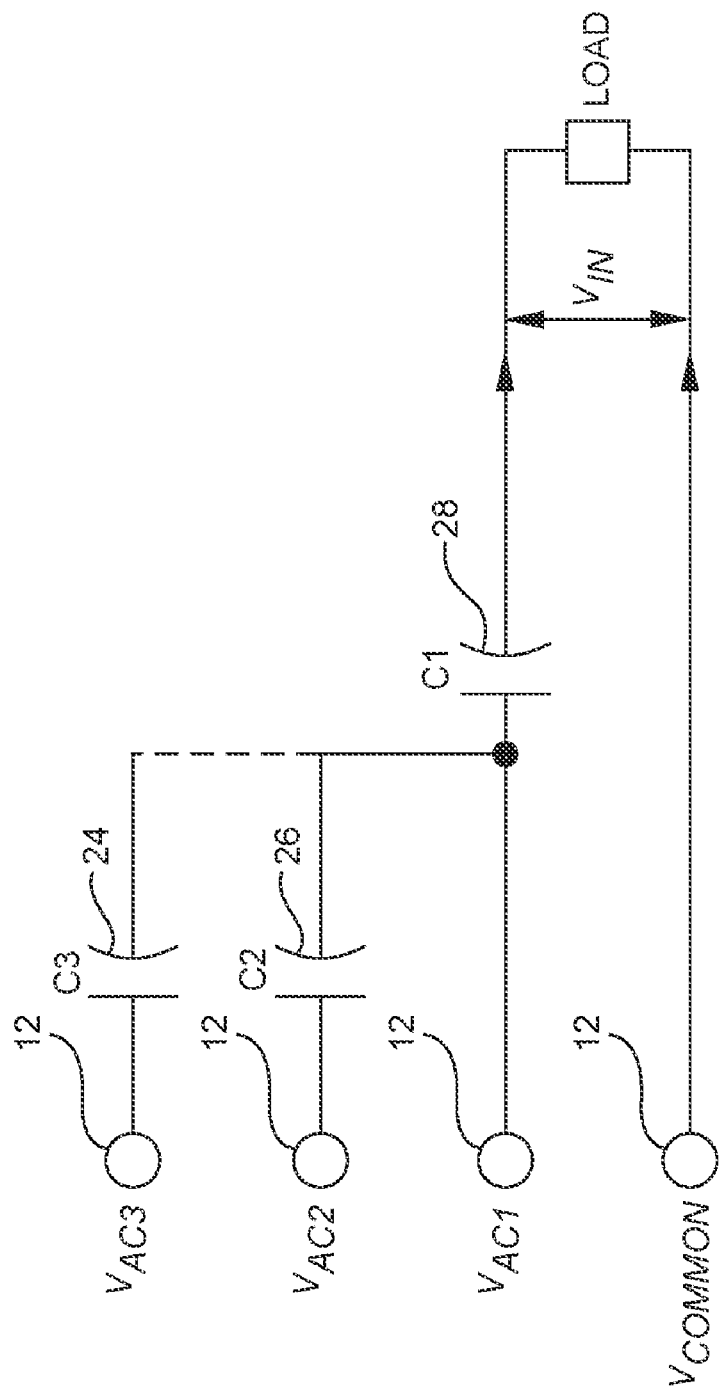
FIG. 2 is a schematic diagram of a conventional capacitively coupled multiple input circuit for a power supply.
Figure 3:
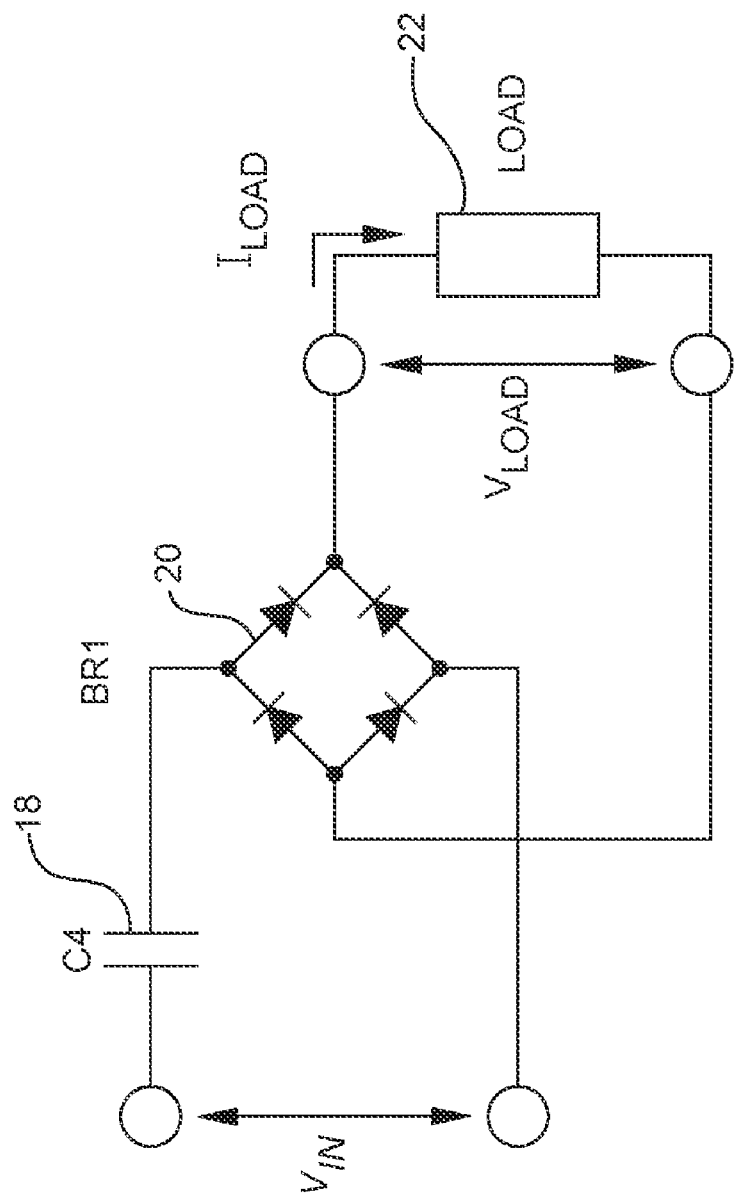
FIG. 3 is a schematic diagram of a conventional capacitively coupled single input power supply.
Figure 4:
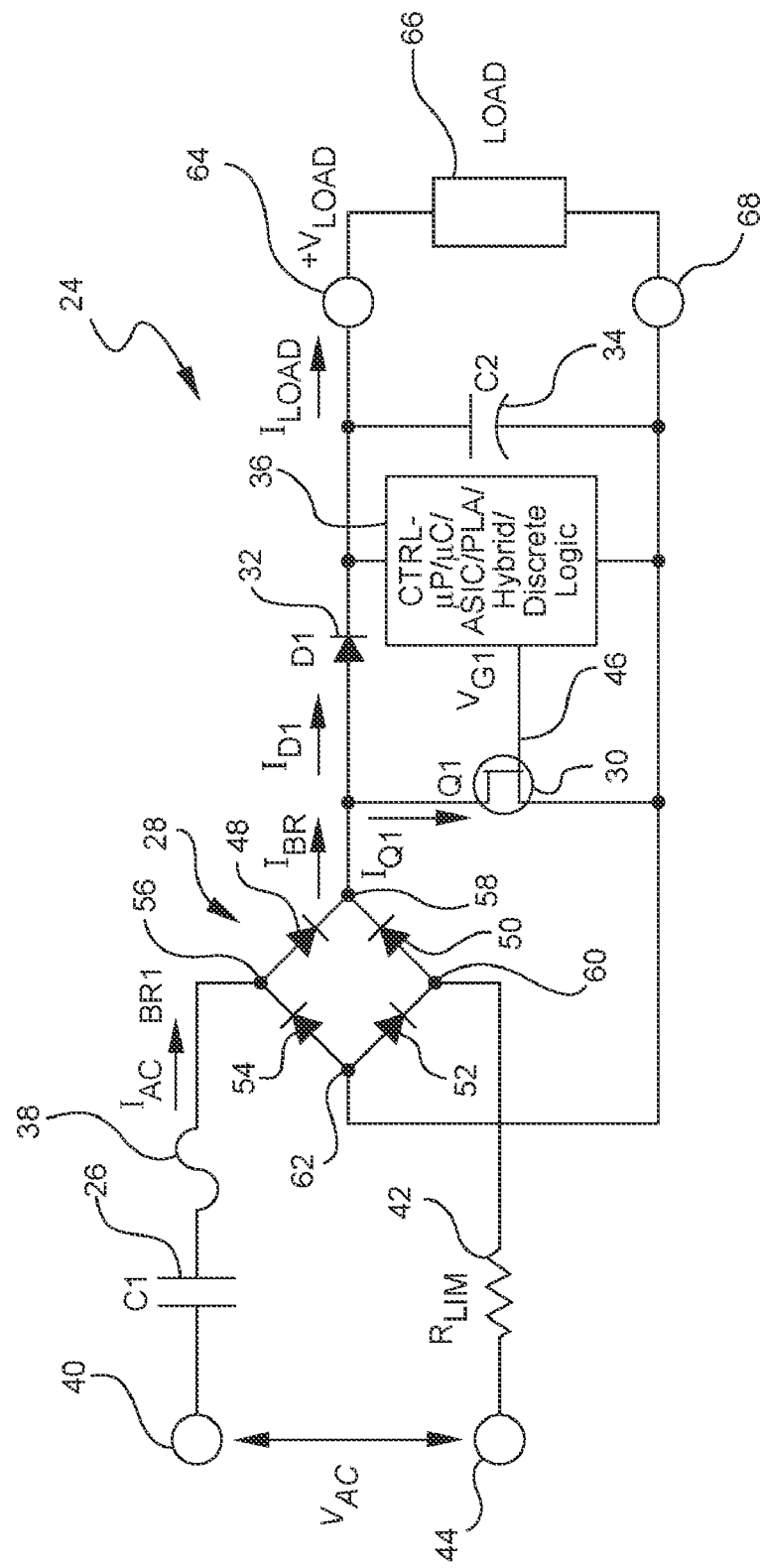
FIG. 4 is a schematic diagram of a power supply formed in accordance with the present invention.

FIG. 4 shows a schematic diagram of a first embodiment of the power supply 24 formed in accordance with the present invention. The power supply 24 preferably includes a non-polarized capacitor 26 having a rated voltage that is equal to or greater than the maximum ac input voltage to be applied. The rated value of the capacitor 26 must also be large enough to supply the current required by a load 66, the load current $I_{LOAD}$, at the minimum ac input voltage to be applied.

The power supply 24 also preferably includes a bridge rectifier 28, a switching component or field effect transistor (FET) 30, an isolation diode 32, an energy-storage or filtering capacitor 34, and a constant-voltage switching control circuit 36. The capacitor 26 is preferably connected electrically in series with a fuse 38 between a positive terminal 40 of the ac input signal and the rectifier bridge 28. A current limiting resistor 42 is preferably connected electrically in series between a negative terminal 44 of the ac input signal and the rectifier bridge 28.

The control circuit 36 preferably outputs a control signal 46 to a gate terminal of the FET 30, which is adapted for turning the FET 30 on or off. The control signal 46 preferably exhibits a constant frequency, such as from 20 kHz and 100 kHz, with a variable or modulated pulse length or duty cycle.

The rectifier bridge preferably includes diodes 48, 50, 52, 54 and nodes 56, 58, 60, 62. Fuse 38 is preferably connected to node 56 and the anode of diode 48. The cathode of diode 48 is connected to node 58 and the cathode of diode 50. The anode of diode 50 is connected to node 60, the cathode of diode 52, and resistor 42. The anode of diode 52 is connected to node 62 and the anode of diode 54. The cathode of diode 54 is connected to node 56.

Source and drain terminals of the FET 30 are preferably connected electrically in parallel across nodes 58 and 62 of the rectifier bridge 28. The anode of diode 32 is connected to node 58 of the rectifier bridge 28, and its cathode is connected to the control circuit 36, an anode of capacitor 34, and a first terminal 64 of a load 66. Node 62 of the rectifier bridge 28 is preferably connected to the control circuit 36, the cathode of capacitor 34, and a second terminal 68 of the load 66.

The current required by the load $I_{LOAD}$ is preferably regulated in order to keep the load voltage $V_{LOAD}$ constant. This is preferably achieved by splitting the total average dc current from the bridge $I_{BR}$ between two components: the current through the diode $I_{D1}$ and the diverted current $I_{Q1}$ through the FET 30. The diode current $I_{D1}$ preferably has an average value that is slightly larger than the load current $I_{LOAD}$, which is primarily due to the current consumed by the control circuit 36 and other secondary energy conversion factors, such as thermal losses. As the current supplied by the rectifier bridge $I_{BR}$ varies widely from zero to the peak of the ac input voltage $V_{AC}$, the control circuit 36 preferably switches the FET 30 on and off with a variable duty factor in order to keep the diode current $I_{D1}$ substantially constant, or as required by the load 66.

Figure 5A:
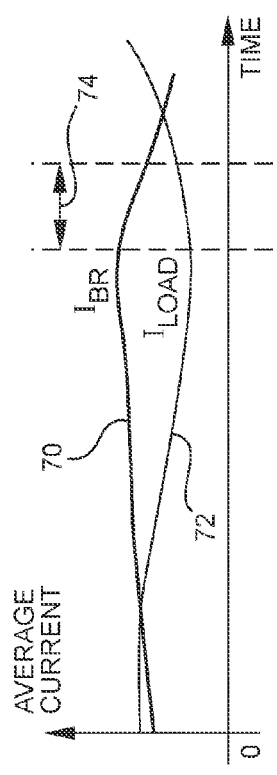
FIG. 5a is a graph of rectifier current $I_{BR}$ and load current $I_{LOAD}$ as a function of time for the power supply shown in FIG. 4.
Figure 5B:
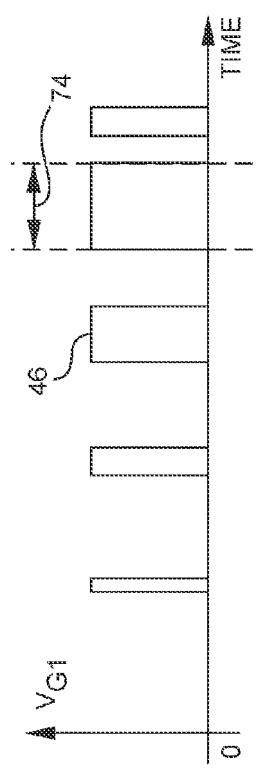
FIG. 5b is a graph of gate voltage VG1 or a control signal as a function of time for the power supply shown in FIG. 4.
Figure 5C:
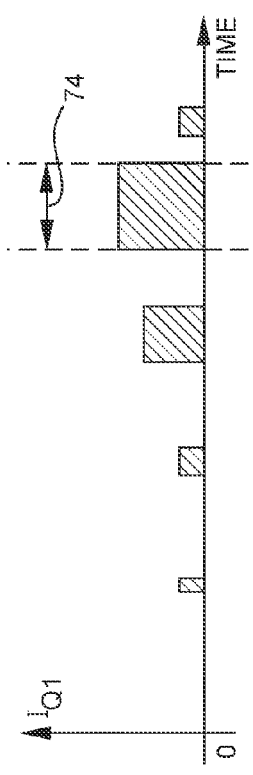
FIG. 5c is a graph of diverted current $I_{Q1}$ as a function of time for the power supply shown in FIG. 4.

In FIG. 5a, line 70 represents the rectifier current $I_{BR}$ as a function of time and line 72 represents the load current $I_{LOAD}$ as a function of time. FIGS. 5b and 5c show graphs of the control signal 46 or gate voltage VG1 and diverted current $I_{Q1}$, respectively, as functions of time, which correspond to FIG. 5a. Preferably, the greater the difference between $I_{BR}$ and $I_{LOAD}$, the longer the conduction time of the FET 30 and the greater the value of the diverted current $I_{Q1}$. That is, the control circuit 36 preferably controls the FET 30 such that only the average current needed to supply the control circuit 36 and the load 66 passes through the diode 32. The remainder is diverted through the FET 30 during its conduction cycle and short-circuited to the rectifier bridge 28.

For instance, during the period of time 74 shown in FIGS. 5a-c, the control signal 46 or gate voltage $V_{G1}$ is high, which turns the FET 30 on and causes it to conduct. When the FET 30 is on, current is diverted from the load 66 (as the diverted current $I_{Q1}$) which increases to compensate for the difference between the rectifier current $I_{BR}$ and the current required by the load $I_{LOAD}$. The diode 32 functions to isolate the load 66 from the effects of the FET 30 switching on and off.

An advantage of the power supply formed in accordance with the present invention is that, during the conduction phase of FET 30, although the rectifier bridge 28 is short-circuited, the ac input current $I_{AC}$ is limited by the impedance of capacitor 26 to a value not much larger than its average value. In addition, the active or real power consumption of the power supply is negligible and limited to the residual power losses of the components in the ac portion of the power supply, which include the fuse 38, limiting resistor 42, FET 30, and bridge diodes 48, 50, 52, 54. This enables the entire power supply to function with high efficiency (low power losses) while supplying the load 66 with a constant voltage and/or current.

Conventional switching power supplies, such as that described in U.S. Pat. No. 6,351,073, which is incorporated herein by reference, use a switching element electrically connected in series with the ac input signal and an inductive element as shown in FIGS. 1-4 of the '073 patent. However, the power supply formed in accordance with the present invention utilizes a switching element, such as the FET 30, electrically connected in parallel with the rectifier bridge 28.

Thus, the power supply formed in accordance with the present invention provides energy efficiency with very low power loss or heat dissipation, and a leading power factor rather than the lagging power factor inherent in conventional transformer-based input power supplies. The subject power supply also does not require inductive components, such as transformers and inductors. In addition, the only components required to be rated for high ac voltage are the capacitor 26, rectifier bridge 28, and protection components, such as the fuse 38 and limiting resistor 42. This results in a smaller and more cost-effective approach than that offered by prior art solutions.

Figure 8:
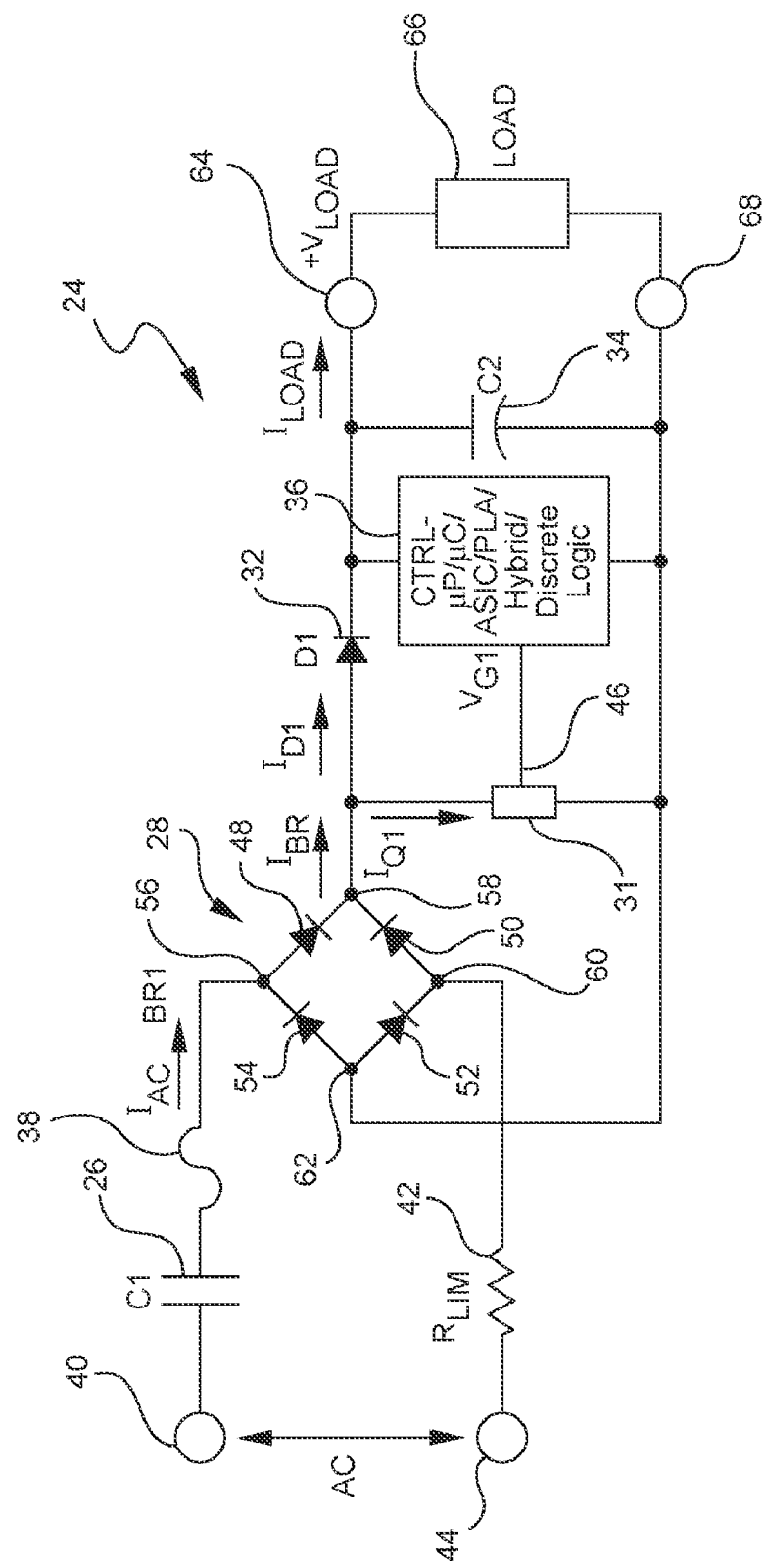
FIG. 8 is a schematic diagram of an alternative embodiment of a power supply formed in accordance with the present invention.

It is to be noted that the FET 30, although shown in FIG. 4 and described as a field effect transistor, could as well be replaced or supplemented by any type of switching component 31 shown in FIG. 8, such as a bipolar transistor, metal oxide semiconductor field effect (MOSFET) transistor, discrete component, relay, and/or one or more integrated circuits while remaining within the scope of the present invention. In addition, the switching power supply may be implemented with discrete components or manufactured as an integrated circuit while remaining within the scope of the present invention.

Figure 6:
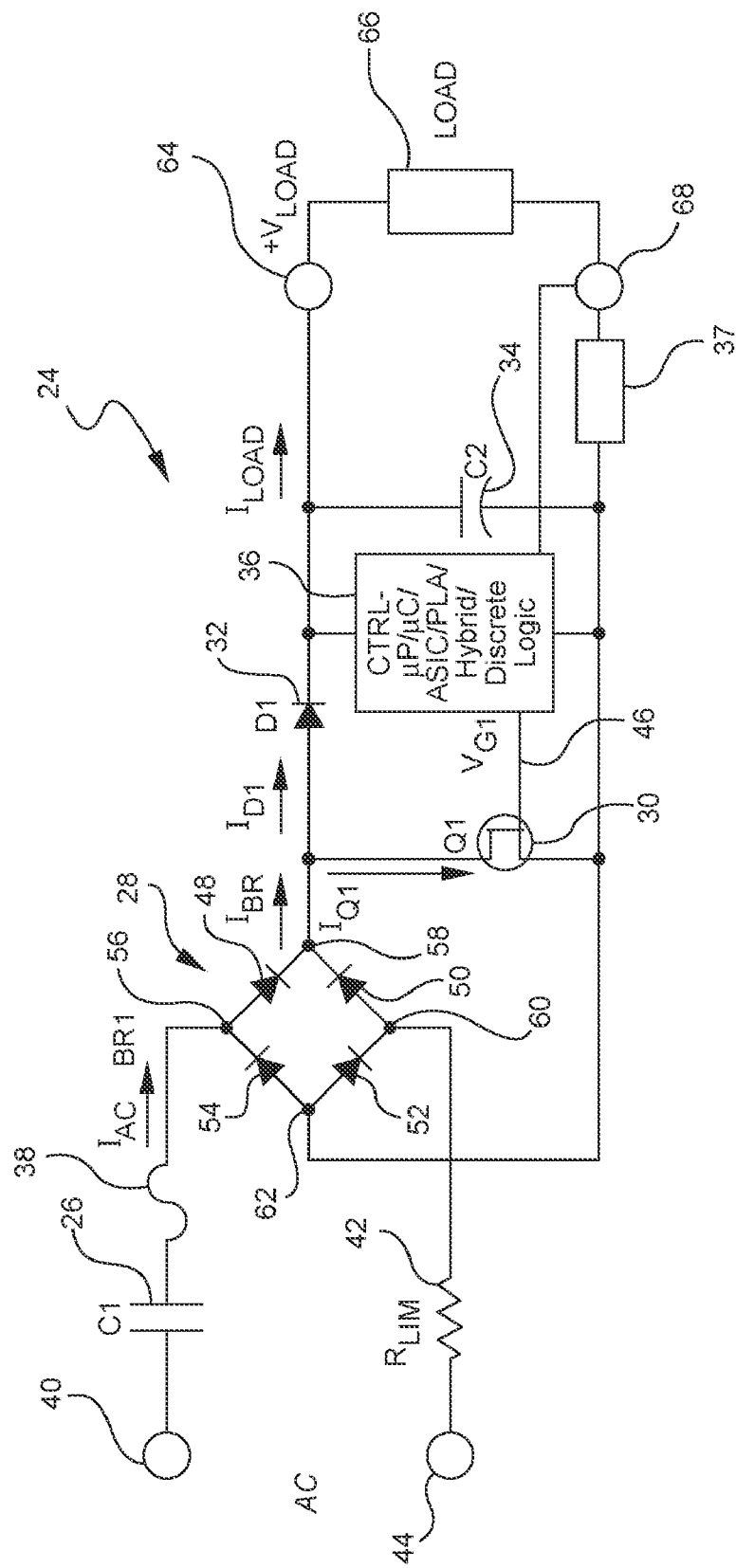
FIG. 6 is a schematic diagram of an alternative embodiment of a power supply formed in accordance with the present invention.
Figure 7A:
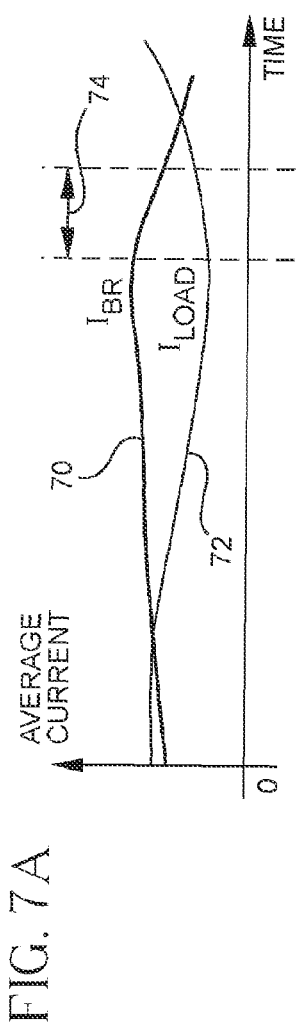
FIG. 7a is a graph of rectifier current $I_{BR}$ and load current $I_{LOAD}$ as a function of time for the power supply shown in FIG. 6.
Figure 7B:
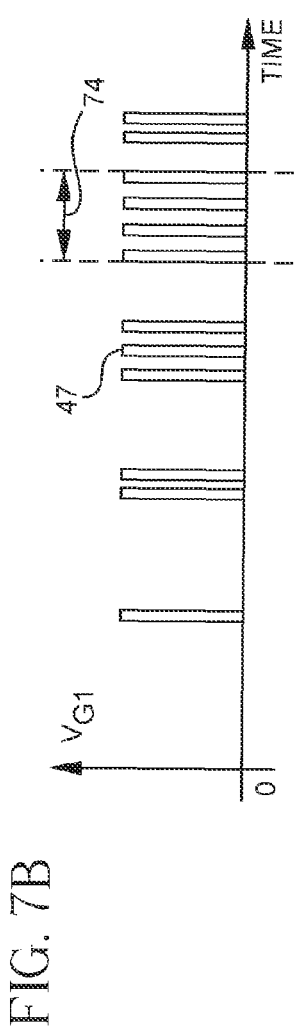
FIG. 7b is a graph of gate voltage VG1 or a control signal as a function of time for the power supply shown in FIG. 6.
Figure 7C:
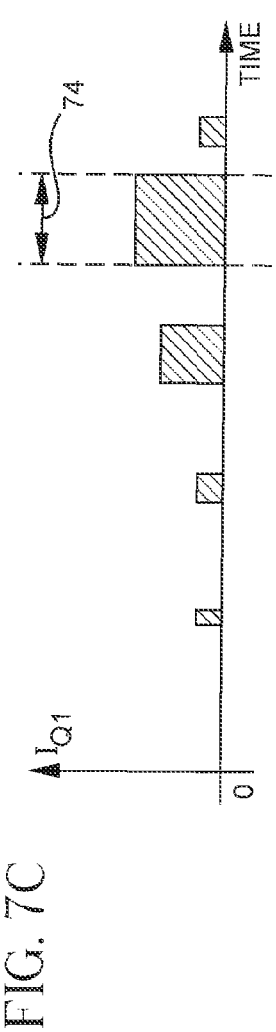
FIG. 7c is a graph of diverted current $I_{Q1}$ as a function of time for the power supply shown in FIG. 6.

Further, the control circuit 36 may be implemented using a microprocessor, microcontroller, application specific integrated circuit (ASIC), programmable logic array (PLA), hybrid circuit, and/or one or more discrete logic devices. Yet further, the control circuit 36 may be adapted for supplying a constant dc output voltage, as shown in FIG. 4, or for supplying a constant dc output current, as shown by the control circuit 36 that monitors a sensing resistor 37, which provides a voltage representing $I_{LOAD}$, as shown in FIG. 6. Still further, the control circuit may be adapted to output the control signal 46 with a constant frequency and modulated pulse width, as shown in FIG. 5b, and/or a constant pulse width frequency modulated control signal 47, as shown in FIG. 7b.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A power supply, which comprises:
   a single capacitor directly coupled to an alternating current (ac) input signal without another capacitor coupled therebetween, the ac input signal comprising any ac input voltage selected from a range of ac input voltages spanning at least 300Vac;
   a bridge rectifier, the bridge rectifier being operatively coupled through the capacitor to the ac input signal, the bridge rectifier outputting a rectified signal, the rectified signal providing power to a load;
   a switching device, the switching device being electrically coupled in parallel with the bridge rectifier; and
   a controller, the controller being responsive to the rectified signal, the controller selectively controlling the switching device to divert at least a portion of the rectified signal through the switching device and away from the load in response to the rectified signal, thereby providing at least one of a regulated voltage across the load and a regulated current through the load, the power supply being adapted to operate without an inductive component.

2. The power supply as defined by claim 1, further comprising an output and a first capacitor, the first capacitor being electrically coupled in parallel with the output.

3. The power supply as defined by claim 1, further comprising a second capacitor, the second capacitor being electrically coupled in series with the alternating current (ac) signal.

4. The power supply as defined by claim 1, further comprising a fuse, the fuse being electrically coupled in series with the alternating current (ac) signal.

5. The power supply as defined by claim 1, further comprising a resistor, the resistor being responsive to the alternating current (ac) signal, the resistor being electrically coupled in series with the bridge rectifier.

6. The power supply as defined by claim 1, further comprising a diode, the diode being electrically coupled in series with the bridge rectifier.

7. The power supply as defined by claim 1, wherein the controller selectively controls the switching device with a control signal, the control signal comprising a substantially constant frequency and a modulated pulse width.

8. The power supply as defined by claim 1, wherein the controller selectively controls the switching device with a control signal, the control signal comprising a modulated frequency and a substantially constant pulse width.

9. The power supply as defined by claim 1, wherein the switching device comprises at least one of a bipolar transistor, field effect transistor (FET), metal oxide semiconductor field effect transistor (MOSFET), discrete device, relay, and integrated circuit.

10. The power supply as defined by claim 1, further comprising an output, the controller selectively controlling the switching device in response to a voltage at an output of the power supply.

11. The power supply as defined by claim 1, further comprising an output the controller selectively controlling the switching device in response to a current at an output of the power supply.

12. The power supply as defined by claim 1, wherein the controller comprises at least one of a microprocessor, microcontroller, application specific integrated circuit (ASIC), programmable logic array (PLA), hybrid circuit, and discrete logic device.

13. The power supply as defined by claim 1, further comprising an output, the controller being electrically coupled in parallel with the output, the controller being adapted to selectively control the switching device such that a substantially constant voltage is maintained at the output.

14. The power supply as defined by claim 1, further comprising an output and a sensing resistor, the sensing resistor being electrically coupled in series with the output and outputting a sensing signal, the controller being responsive to the sensing signal, controller being adapted to selectively control the switching device such that that a substantially constant current is maintained at the output in response to the sensing signal.

15. The power supply as defined by claim 1, wherein the range of ac input voltages comprises 100Vac to 400Vac.

16. A method of supplying power comprising:
coupling a single capacitor directly to an alternating current (ac) input signal without another capacitor coupled therebetween, the ac input signal comprising any ac input voltage selected from a range of ac input voltages spanning at least 300Vac;
coupling a bridge rectifier operatively to the ac input signal through the capacitor, the bridge rectifier outputting a rectified signal, the rectified signal providing power to a load;
coupling a switching device electrically in parallel with the bridge rectifier; and
controlling the switching device to divert at least a portion of the rectified signal through the switching device and away from the load in response to the rectified signal, thereby providing at least one of a regulated voltage across the load and a regulated current through the load, the power supply being adapted to operate without an inductive component.

17. The method of supplying power as defined by claim 16, further comprising controlling the switching device with a control signal, the control signal comprising a substantially constant frequency and a modulated pulse width.

18. The method of supplying power as defined by claim 16, further comprising controlling the switching device with a control signal, the control signal comprising a modulated frequency and a substantially constant pulse width.

19. The method of supplying power as defined by claim 16, further comprising controlling the switching device in response to a voltage at an output of the power supply.

20. The method of supplying power as defined by claim 16, further comprising controlling the switching device in response to a current at an output of the power supply.

21. The method of supplying power as defined by claim 16, further comprising coupling a diode electrically in series with the bridge rectifier.

22. The method of supplying power as defined by claim 16, wherein the range of ac input voltages comprises 100Vac to 400Vac.

* * * * *